Dec. 28, 1948.  R. R. STEVENS  2,457,610
CONTROL APPARATUS FOR PRIME MOVERS
Filed May 22, 1943  2 Sheets-Sheet 1

INVENTOR
Roy R. Stevens
BY
ATTORNEY

Dec. 28, 1948.   R. R. STEVENS   2,457,610
CONTROL APPARATUS FOR PRIME MOVERS
Filed May 22, 1943   2 Sheets-Sheet 2

INVENTOR
Roy R. Stevens
BY
ATTORNEY

Patented Dec. 28, 1948

2,457,610

UNITED STATES PATENT OFFICE 2,457,610

CONTROL APPARATUS FOR PRIME MOVERS

Roy R. Stevens, Forest Hills, Pa., assignor to The Westinghouse Air Brake Company, Wilmerding, Pa., a corporation of Pennsylvania Application May 22, 1943, Serial No. 488,040

6 Claims. (Cl. 60—97)

This invention relates to control apparatus for prime movers and more particularly to means for controlling the starting, reversing and speed or power output of a plurality of prime movers, such as of the Diesel type.

In ships provided with a plurality of engines of the reversible Diesel type connected to individual propellers it is desirable to selectively control the engines either individually or in multiple in order to obtain a relatively high degree of maneuverability of the ship, such as movement either forwardly or in an astern direction under power of any desired number of the engines, rapid turning of the ship, and reversal of the direction of movement of the ship.

One object of the invention is therefore the provision of the control system for a plurality of reversible prime movers such as Diesel engines which provides for selective individual or multiple control of the engines to accomplish the above results.

Another object of the invention is the provision of such an apparatus providing for either individual or multiple control of the starting, the reversing and speed or power output of a plurality of Diesel engines.

Another object of the invention is the provision of such a control apparatus embodying arrangements which are operative automatically to nullify the multiple control upon operation of the individual control, and vice versa, so as to avoid interference between the two different controls.

Still another object of the invention is the provision of such an apparatus particularly adapted for controlling Diesel engines from a remote station, such as the pilot house or bridge of a ship.

A further object of the invention is the provision of a remote pneumatic control system for selectively controlling the starting, reversing and the speed or power output of a plurality of Diesel engines.

Another object of the invention is the provision of a control apparatus for a plurality of Diesel engines embodying means for adjusting the speed or power output of one of the engines relative to another for the purpose of either obtaining a specific desired speed or output of said engine, or for synchronizing the speed or power output of said engine with that of another engine.

Other objects and advantages will be apparent from the following more detailed description of the invention.

Figure 1:
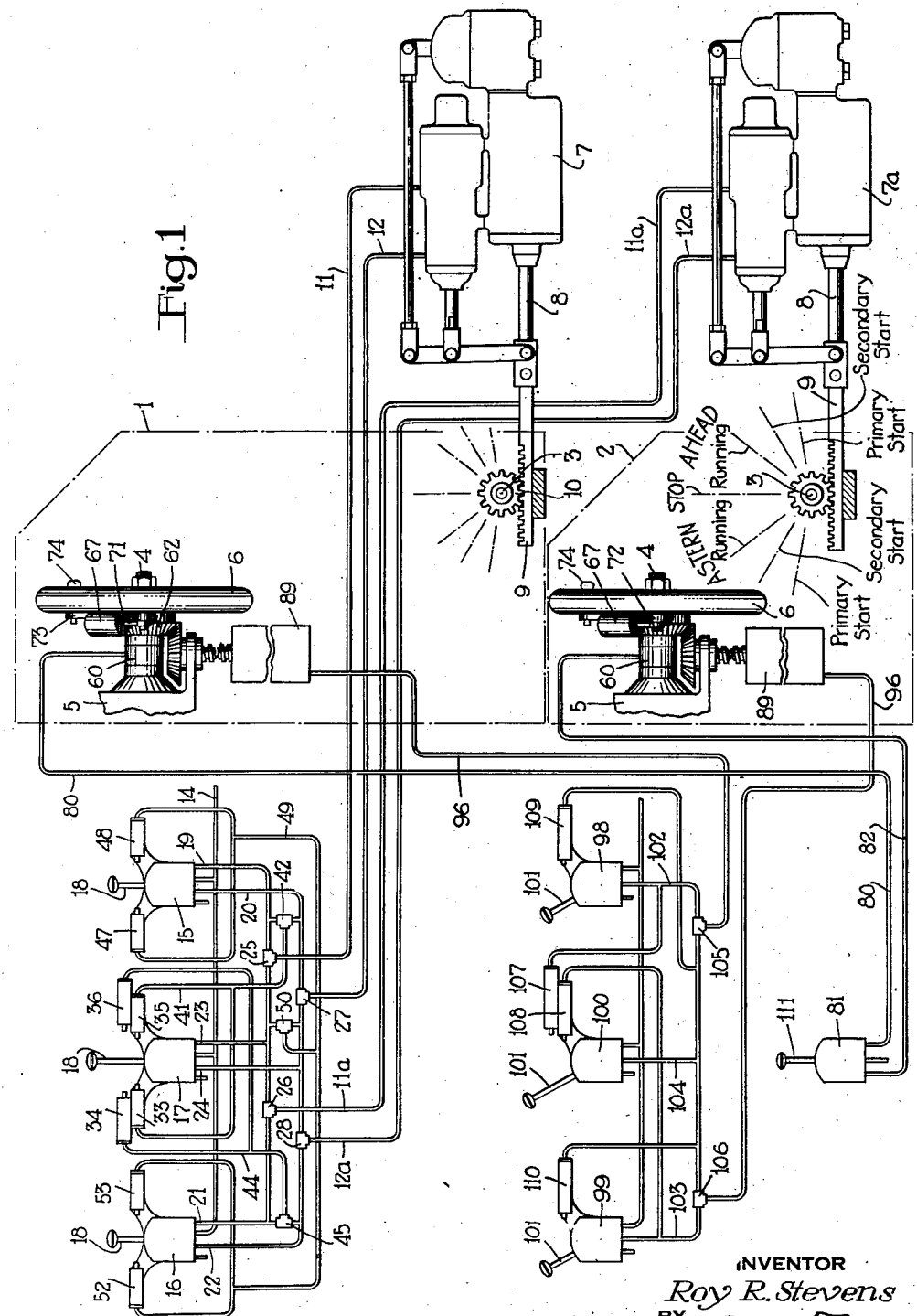
Figure 2:
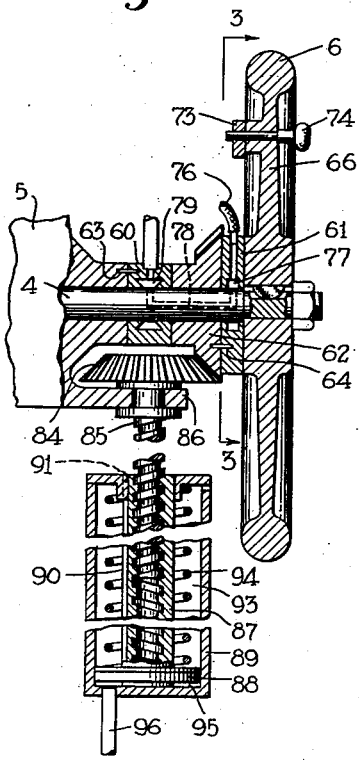
Figure 3:
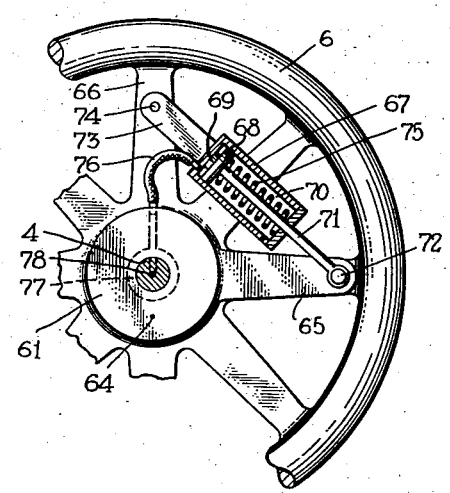
Figure 5:
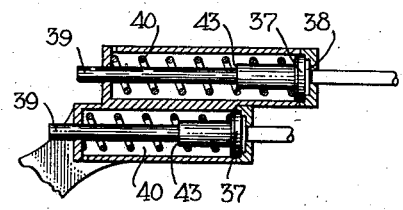
Figure 4:
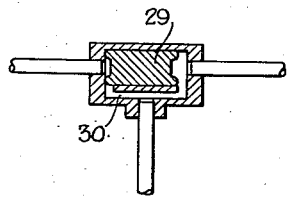

In the accompanying drawings; Fig. 1 is a diagrammatic view in outline of a control system embodying the invention; Fig. 2 is a sectional view, at an enlarged scale, of a portion of the apparatus shown in Fig. 1; Fig. 3 is a sectional view taken on the line 3—3 in Fig. 2; Fig. 4 is a longitudinal sectional view of a device shown in elevation in Fig. 1; and Fig. 5 is a sectional view of a portion of a control device shown in elevation in Fig. 1.

Description

In the drawings, the dot and dash line enclosures designated by reference numerals 1 and 2 indicate two reversible Diesel engines each of which is provided with the usual starting and reversing control shaft 3 and governor control shaft 4.

For illustrative purposes only, each of the starting and reversing control shafts 3 may, as indicated by legends in Fig. 1, have a neutral or "Stop" position for stopping the engine. Each shaft 3 may be rotated from this "Stop" position in the direction of the legend "Ahead" to "Primary start" and "Secondary start" positions for placing the engine in motion in a direction such as to cause ahead movement of a ship. After the engine is thus started, the shaft 3 may be turned to an adjacent "Running" position in which it will then remain until it is subsequently desired to stop or reverse the engine. Each shaft 3 may also be rotated in the opposite direction from "Stop" position, that is, in the direction of the legend "Astern" to "Primary start" and "Secondary start" positions for placing the engine in motion in the reverse direction and then to an adjacent "Running" position in which it will be left until it is subsequently desired to stop or reverse the direction of operation of the engine.

Each of the governor control shafts 4 is operable to govern the supply of fuel to and thereby the speed or power output of the respective engine and may therefore have an engine idling position, in which it is shown in the drawing, to provide for operation of the engine at idling speed, and may be rotatable from this idling position in a counterclockwise direction, as viewed in Fig. 3, for increasing the fuel supply to the engine to increase the speed or power output thereof. Each shaft 4 may be journaled in a bracket 5 associated with the respective engine and may carry at its end the usual hand wheel 6 for manually adjusting the engine fuel supply.

The parts so far described and the means controlled thereby may be of any conventional type well known to those skilled in the art and a further disclosure and description thereof are not essential to a clear understanding of the invention.

According to the invention means are provided for adjusting either individually or in unison independent means such as the starting and reversing shafts 3, and the governor control shafts 4 of the two engines 1 and 2. The arrangement for controlling the starting and reversing shafts 3 will be first described.

*Control of Starting and Reversing Shafts 3*

For adjusting the shafts 3 in engines 1 and 2, I associate therewith like power devices, preferably in the form of fluid motors 7 and 7a respectively, each of which may embody a reciprocable member 8 connected by a rack 9 and gear 10 to the respective shaft. The motors may be of any desired construction, as for example like the motor fully disclosed and described in my copending application Serial No. 463,792, filed October 29, 1942, Patent No. 2,383,278, August 21, 1945, which embodies means operative to position a member, like the member 8, in accordance with pressure of fluid provided in either one of two pipes, like pipes 11 and 12 connected to the motor 7, and pipes 11a and 12a connected to the motor 7a. The pipes 11 and 11a may be called forward pipes, while the pipes 12 and 12a may be called reverse pipes.

With all of these pipes open to the atmosphere the motors 7 and 7a will cause the members 8 to assume a neutral position, as shown in the drawings, for positioning the respective starting and reversing shafts 3 in their "Stop" positions. When fluid at a certain maximum pressure is provided in pipes 11 and 11a, the motors 7 and 7a will cause the members 8 to operate racks 9 and gears 10 to turn the respective starting and reversing shafts 3 in the "Ahead" direction to the "Primary start" positions. When the pressure of fluid in these pipes 11 and 11a is at a certain lower degree the motors 7 and 7a will cause the respective shafts 3 to assume their "Secondary start" positions at the "Ahead" side of "Stop," and when at a still lower degree said motors will cause the shafts 3 to assume their adjacent "Running" positions. On the other hand, if the same different degrees of fluid pressure is provided in the reverse pipes 12 and 12a the motors 7 and 7a will operate to rock the shafts 3 in the "Astern" direction to corresponding positions. A further description of the structure and operation of the fluid motors 7 and 7a is not deemed essential to an understanding of the invention and hence will be omitted.

At a remote control station, such as on the bridge of a ship, I provide two independent self-lapping manually operative control devices, 15 and 16, for individually controlling the motors 7 and 7a, respectively, and a manually operative master self-lapping control device 17 for controlling both of said motors in unison or multiple.

The control devices 15 and 16 may be of identical construction, as well as the control device 17 with but one exception which will be later described, and all of these devices may be generally similar, if desired, to a corresponding device fully disclosed in the copending application hereinbefore referred to, in view of which a detailed disclosure and description of the devices is not essential in the present application to an understanding of the invention.

Briefly, the control device 15 comprises valve means (not shown) controlled by an operator's lever 18 for providing in either of two pipes 19 or 20 fluid at a pressure determined by the position of the lever, while maintaining the other pipe open to the atmosphere. The lever may have a neutral position in which it is shown in the drawing for opening both pipes 19 and 20 to the atmosphere. Movement of the lever in a clockwise direction from neutral position will provide fluid in pipe 19 at a pressure corresponding to the distance said lever is away from the neutral position, while movement in the opposite direction from neutral position will provide like pressures of fluid in pipe 20.

The control device 16 is operative to control pressure of fluid in two pipes 21 and 22, while the control device 17 is operative to control pressure of fluid in two pipes 23 and 24, in accordance with operation of the control levers 18 of said devices, in the same manner as just described in connection with control device 15.

Fluid under pressure for supply to the pipes 19 to 24 is conducted to the control device 15, 16 and 17 from any suitable source by way of a supply pipe 14.

The pipes 19 and 23 are connected to opposite ends of a double check valve device 25 the side outlet of which is connected to pipe 11. The pipe 23 is also connected to one end of a double check valve device 26, the opposite end of the device being connected to pipe 21, while the side outlet of said device is connected to pipe 11a. The pipe 24 is connected to one end of each of two double check valve devices 27 and 28, the opposite ends of which are connected respectively to pipes 20 and 22. The side outlet of the double check valve device 27 is connected to pipe 12, while that of the double check valve device 28 is connected to pipe 12a.

Each of the double check valve devices 25 to 28 may, as shown in Fig. 4 of the drawings, comprise a casing containing a double ended check valve 29 arranged to control communication between the two pipes connected to the opposite ends of the device and a passage 30 which is in constant communication with the pipe connected to the side of the device. The check valve 29 will be moved to the position shown in Fig. 4 by fluid supplied through the pipe open to the right hand end thereof for thereby opening communication between such pipe and passage 30 and for closing communication between passage 30 and the pipe open to the opposite end of the check valve. If fluid under pressure is supplied to the pipe open to the left hand end of check valve 29, said check valve will be shifted to its opposite position for opening communication between said pipe and passage 30 and for closing communication between passage 30 and the pipe open to the right hand end of the check valve.

From the above description, it will now be seen that with levers 18 of the control devices 15, 16 and 17 in their neutral positions as shown in the drawings, the pipes 11 and 12, and 11a and 12a will all be open to the atmosphere through either one or another of said devices, whereby the motors 7 and 7a will position the starting and reversing shafts 3 of the two engines in their "Stop" positions.

If lever 18 of the control device 15 is now moved from its neutral position in a clockwise direction fluid under pressure will be supplied to pipe 19 and thence through double check valve device 25 and pipe 11 to the fluid motor 7 and cause said motor to operate to turn the starting and reversing shaft 3 of the engine 1 out of "Stop" position in the direction of the legend "Ahead"

and to a position corresponding to the pressure of fluid provided in pipe 11 and thereby to the position of lever 18 of the control device 15. As above described, the motor 7 will operate to position the start and reversing shaft 3 of engine 1 in accordance with pressure of fluid in pipe 11 and that certain definite degrees of pressure are required in said pipe in order for the motor to position said shaft in its different positions at the "Ahead" side of its "Stop" position. These definite pressure will be provided in pipe 11 in definite positions of lever 18 of the control device 15 to the right of its neutral position shown. Thus if the lever 18 of the control device 15 is moved to the position required for providing fluid in pipe 11 at the pressure for causing motor 7 to operate shaft 3 in a clockwise direction to its "Primary start" position, said shaft will be so positioned to cause starting the engine. Return of lever 18 of control device 15 toward its neutral position to definite positions will provide in pipe 11 the different degrees of fluid pressure for causing the motor 7 to return the start and reversing shaft 3 of engine 1 to the "Secondary start" and "Running" positions, as desired. Return of lever 18 of device 15 to its neutral position with a consequent complete release of fluid from pipe 11, will cause motor 7 to return the start and reversing shaft 3 to its "Stop" position.

Movement of lever 18 of the control device 15 in a counterclockwise direction to positions to the left hand side of its neutral position will provide fluid in pipe 20 and thence through the double check valve device 27 and pipe 12 in the motor 7 to cause operation of said motor to position the start and reversing shaft 3 of engine 1 at the "Astern" side of "Stop" position in accordance with the degree of such pressure. Thus movement of the lever 18 of the control device 15 to selected positions at the left hand side of its neutral position may cause operation of the motor 7 to turn the start and reversing shaft 3 to any selected one of the positions at the "Astern" side of "Stop" indicated by legends in the drawing. Return of the lever 18 of the control device 15 to its neutral position will cause motor 7 to return the start and reversing shaft 3 to its "Stop" position.

Pipes 21 and 22 extending from the manual control device 16 are, as above described, connected through the double check valve devices 26 and 28 to pipes 11a and 12a respectively, leading to the motor 7a and from the above description of operation of the control device 15 and motor 7, it will be apparent that by movement of lever 18 of the control device 16 in either one direction or the opposite direction from its neutral position shown, to different definite positions, the fluid motor 7a may be caused to operate to position the start and reversing shaft 3 of engine 2 in any selected one of its different positions indicated by legends in the drawing.

It will now be seen that the two independently operative manual control devices 15 and 16 provide for individual control of the starting, reversing and running of the two engines 1 and 2.

If lever 18 of the master control device 17 is moved out of its neutral position in a clockwise direction fluid will be supplied to pipe 23 and thence through both double check valve devices 25 and 26 to pipes 11 and 11a and thus simultaneously to both of the fluid motors 7 and 7a, and it will be seen that by proper positioning of said lever the start and reversing shafts 3 of both engines 1 and 2 may be caused to move in unison to any of the like positions at the "Ahead" side of their "Stop" positions.

On the other hand, if the lever 18 of the master control device 17 is moved from neutral position in a counterclockwise direction fluid will be supplied to pipe 24 and thence through both double check valve devices 27 and 28 to pipes 12 and 12a leading to the two fluid motors 7 and 7a, and it will be seen that by proper positioning of said lever, the start and reversing shafts 3 of both engines 1 and 2 may be caused to simultaneously assume any of the like positions at the "Astern" side of their "Stop" position.

It will thus be seen that the master control device 17 provides for synchronous operation and positioning of the starting and reversing shafts 3 of both engines 1 and 2 and may therefore cause simultaneous starting of both engines in either one direction or in the reverse direction. Return of the lever 18 of the master control device 17 to neutral position will effect opening of both pipes 23 and 24 and thereby of pipes 11 and 12, and 11a and 12a to the atmosphere for causing operation of the fluid motors 7 and 7a to turn the two starting and reversing shafts 3 to their neutral position.

In order to prevent interference between the individual and the master control of the two engines it is necessary that the lever 18 of the master control device 17 be maintained in its neutral position shown in the drawing while the engines are being controlled individually by the control devices 15 and 16. It is also necessary that the levers 18 of the individual control devices 15 and 16 be maintained in their neutral positions shown in the drawing, while the two engines are being controlled by the master control device 17. This is accomplished in a manner which will now be described.

Two stop devices 33 and 34 are associated with the control device 17 at one side of the lever 18 while two like stop devices 35 and 36 are associated with said control device at the opposite side of lever 18. As shown in Fig. 5, each of these stop devices may comprise a piston 37 having at one side a pressure chamber 38 and provided with a rod 39 projecting from the opposite side in alignment with the lever 18 and for movement in the same direction as said lever. A spring 40 encircling the rod 39 acts on the piston 37 for urging it to a retracted position shown in Fig. 5 when chamber 38 is open to the atmosphere. With the pistons 37 in the stop devices 33 to 36 in the retracted positions, the rods 39 will be positioned to allow full movement of the respective lever 18 in either direction from its neutral position for controlling the fluid motors 7 and 7a as above described.

The pistons 37 and rods 39 of the stop devices 33 and 35 are adapted to be moved against springs 40 upon supply of fluid under pressure to the pressure chambers 38 to positions which may be defined by engagement between a shoulder 43 provided on each of the rods and the end of the device engaged by said spring. With the pistons 37 and rods 39 thus positioned the lever 18 of the master control device 17 will be held against movement out of neutral position.

The pressure chambers 38 of the two stop devices 33 and 35 are both connected by a pipe 41 to the side outlet of a double check valve device 42 the opposite ends of which are connected to pipes 19 and 20. This check valve device may be identical to the structure shown in Fig. 4. With lever 18 of the individual control device 15 in its neutral position shown opening both pipes 19 and 20 to atmosphere, pipe 41 and thereby pressure chambers 38 in the stop devices 33 and 35 will be vented to allow the pistons 37 in said devices to occupy the positions shown in order that the master control lever 18 may be operated to control the two engines in unison, if such is desired. However, if lever 18 of the individual control device 15 is moved in either direction out of its neutral position shown, the consequent supply of fluid under pressure to either of pipes 19 or 20 will cause flow of fluid under pressure therefrom through the double check valve device 42 to pipe 41 and thence to pressure chambers 38 in the two stop devices 33 and 35 which will operate the pistons 37 therein to move the respective piston rods 39 to the positions defined by shoulders 43 on said rods. In this position of rods 39 of the stop devices 33 and 35, the ends of said rods will engage or substantially so the opposite sides of the lever 18 of device 17 and hold said lever against movement out of neutral position and thus prevent operation of the master control device 17 when the individual control device 15 is being operated to control the motor 7.

The two stop devices 34 and 36 associated with the master control device 17 are provided to act in the same manner as the stop devices 33 and 35, upon operation of the individual control device 16. This is accomplished by connecting the pressure chambers 38 in the two stop devices 34 and 36 by a pipe 44 to the side outlet of a double check valve device 45, like the double check valve device 42, and which has its opposite ends connected to pipes 21 and 22 leading to the individual control device 16. It will thus be seen that upon operation of the individual control device 16, the lever 18 in the master control device 17 will be held in its neutral position.

With lever 18 of both individual control devices 15 and 16 in their neutral positions, the stop devices 33 to 36 will be conditioned to allow movement of lever 18 of master control device 17 as will be apparent.

Associated with the individual control device 15 are two stop devices 47 and 48 while two like stop devices 52 and 53 are associated with the control device 16. These stop devices may all be identical to the devices 33 and 35 and are connected to a pipe 49. Upon supply of fluid under pressure to pipe 49, the stop devices 47, 48, 52 and 53 are operative to hold the respective control levers 18 against manual movement out of their idling positions. When the pipe 49 is relieved of fluid pressure or opened to the atmosphere, the stop devices 47, 48, 52 and 53 will permit movement of the respective levers 18 for controlling individually the motors 7 and 7a.

The pipe 49 is connected to the side outlet of a double check valve device 50 and the end outlets are connected to pipes 23 and 24 leading to the master control device 17. The double check valve device 50 is like any of those above described, so that upon operation of lever 18 of the master control device 17 to supply fluid under pressure to either of pipes 23 or 24, fluid under pressure will flow to pipe 49 and actuate the stop devices 47, 48, 52 and 53 to hold the levers 18 of the individual control devices 15 and 16 against movement out of their neutral positions. With the master control lever 18 in idling position opening the pipes 23 and 24 to atmosphere, the pipe 49 will also be opened to the atmosphere in order to allow individual movement of levers 18 of the control devices 15 and 16.

From the above description it will now be seen that when lever 18 of the master control device 17 is in its neutral position, levers 18 of the individual control devices 15 and 16 can be independently operated to cause operation of motors 7 and 7a to start or to reverse engines 1 and 2, as desired, and during such operation the master control lever 18 is held against movement out of its neutral position to thereby prevent interference of the master control device with operation of the individual control devices. It will also be seen that when the lever 18 of the master control device 17 is moved out of its neutral position for controlling the starting and reversing of the engines 1 and 2 in multiple, the levers 18 of the individual control devices 15 and 16 are held against movement out of their neutral positions in order to avoid interference therefrom.

*Control of governor shafts 4*

Between the bracket 5 and the speed control wheel 6 and mounted on the governor control shaft 4 associated with each of the engines 1 and 2 are two spacer elements 60 and 61 and an intermediate beveled gear 62. The element 60 is interposed between one end of the gear 62 and bracket 5, while the element 61 is interposed between the opposite face of the gear and the wheel 6. The element 60 is secured to the bracket 5 against turning as by pin 63. The element 61 and gear 62 are journaled on the shaft 4 and secured to turn together by a pin 64.

The element 61 is provided with a radial arm 65 the end of which is connected to a spoke 66 of wheel 6 by an extensible link 67. The link 67 comprises a cylinder containing a piston 68 having at one side a pressure chamber 69 and at the opposite side a non-pressure chamber 70. A rod 71, secured at one end to the piston 68, projects through chamber 70 and one end of the cylinder and the outer end of this rod is pivotally connected by a pin 72 to the end of arm 65. Projecting from the opposite end of the cylinder is an arm 73 the end of which is pivotally connected by removable pin 74 to the spoke 66 of wheel 6.

The non-pressure chamber 70 contains a coil spring 75 which encircles the piston rod 71 and is supported at one end by the end of the casing. The opposite end of the spring acts against the piston 68, this spring being under pressure for urging said piston in the direction of chamber 69 to a position defined by contact between the piston and the end of said chamber. Normally, the spring 75 holds the piston 68 in contact with the end of the cylinder, as shown in the drawing, to thereby provide, in effect, a rigid operating connection between arm 65 of member 61 and spoke 66 of the wheel, whereby the wheel may be turned by movement of arm 65.

The pressure chamber 69 in each of the links 67 is connected by a flexible conduit 76 to an annular cavity 77 provided in member 61 around the outer surface of the respective governor control shaft 4. The shaft 4 in turn is provided with a passage 78 one end of which is in constant communication with cavity 77, while the opposite end is in constant registration with an annular cavity 79 provided in member 60 around the periphery of the shaft. The cavity 79 in the structure associated with engine 1 is connected by a pipe 80 to a so-called vernier control device 81, while cavity 79 in the structure associated with engine 2 is connected by pipe 82 to the control device 81, for reasons which will hereinafter be brought out.

The bevel gear 62 associated with each governor control shaft 4 meshes with a drive gear 84 which is secured on one end of a rod 85 journaled in a projection 86 of the respective bracket 5. Below the projection 86 the shaft 85 is provided with a screw-thread which meshes with an internal screw-thread provided on a reciprocatory rod 87. The rod 87 projects from one side of a piston 88 contained in a cylinder 89 and is provided along one side longitudinally thereof with a slot 90 into which projects a tongue 91 forming part of the cylinder 89, this connection securing the piston rod 87 against rotary movement upon longitudinal reciprocation thereof.

Each rod 87 projects through a non-pressure chamber 93 formed at one side of piston 88, and said chamber contains a coil spring 94 encircling said rod and bearing against the piston for urging same to a normal or what may be called an engine idling position, as shown in the drawing. At the opposite side of piston 88 is a pressure chamber 95 connected to a pipe 96 through which fluid under pressure may be supplied to and released from said chamber for positioning the piston 88 against the spring 94. When fluid under pressure is supplied to chamber 95 to a degree which exceeds the opposing force of spring 94 the piston 88 will move against said spring to a position in which the opposing forces become equal. This movement of piston 88 and thereby of rod 87 will act to turn the shaft 85 and gears 84 and 62 and thereby the wheel 6 through the medium of link 67 to a position corresponding to the pressure of fluid acting in chamber 95. With chamber 95 open to the atmosphere the wheel 6 may therefore assume the engine idling position, while upon supply of fluid to said chamber the wheel 6 will be turned out of idling position to a position corresponding to the pressure of such fluid. It will thus be seen that by varying the pressure of fluid in each pressure chamber 95 from atmospheric pressure to a desired degree above atmospheric pressure, the respective wheel 6 may be adjusted to any desired position for obtaining a desired speed or output of the respective engine exceeding that obtained in the idling position.

For individually controlling the two speed control pistons 88 I provide two independently operative speed control devices 98 and 99, while for controlling the operation of these pistons in unison I provide a master speed control device 100.

The control devices 98, 99 and 100 may be generally like the manually operative starting and reversing control devices 15 to 17 except that each comprises a lever 101 having no neutral position. The individual speed control devices 98 and 99 are arranged to vary pressure of fluid in pipes 102 and 103, respectively, while the master control device 100 is arranged to vary the pressure of fluid in a pipe 104. The lever 101 of each of these control devices has a normal or engine idling position in which it is shown for opening the respective pipe to atmosphere and is adjusable out of the idling position to positions at the righth hand side thereof to provide fluid in the respective pipe at pressures corresponding to the distance the lever is away from the idling positions.

The pipes 102 and 104 are connected to opposite ends of a double check valve device 105 the side outlet of which is connected to pipe 96 leading to cylinder 89 associated with the engine 1. Pipe 104 is also connected to one end of a double check valve device 106 the opposite end of which is connected to pipe 103, while the side outlet of this double check valve device is connected to pipe 96 leading to cylinder 89 associated with the engine 2. The double check valve devices 105 and 106 may be identical to those hereinbefore described, and as shown in Fig. 4.

With the structure just described it will be seen that the speed of engines 1 and 2 may be individually controlled by operation of the individual control devices 98 and 99, respectively, or jointly controlled by operation of the master control device 100.

Associated with the master control device 100 are two stop devices 107 and 108 containing pistons (not shown) arranged to be operated by fluid pressure for holding the master control lever 101 against movement out of its idling position. These stop devices may be substantially like the stop devices 35 and 36 associated with the master control device 17 hereinbefore described, and are connected respectively to pipes 102 and 103 connected to the individual speed control devices 98 and 99. It will thus be seen that when the individual speed control devices 98 or 99 are operated to control the speed of the respective engines one or the other or both of the stop devices 107 or 108 will operate to hold the control lever 101 of the master speed control device 100 against movement out of its idling position. A stop device 109 associated with the individual control device 98 is connected to pipe 104 leading to the master control device 100. A like stop device 110 is associated with the individual control device 99 and is also connected to pipe 104, whereby upon operation of the master control device 100 to control of the speed of the two engines in unison the stop devices 109 and 110 will operate to hold levers 101 of the individual control devices 98 and 99 in their engine idling positions.

As so far described it will be noted that the speed of the engine is adjusted through the medium of the adjustable or extensible links 67 connected to the speed control wheels 6, said links, in effect, acting under this condition like rigid links.

In order to effect a minor adjustment in speed or output of either of the engines 1 or 2 relative to the other, as after adjustment of the speed by operation of one or another of the speed control devices 98, 99 or 100, fluid under pressure may be supplied to pressure chamber 69 in the respective extensible link 67, and when this pressure becomes sufficient to overcome the opposing force of spring 75 on piston 68, the cylinder mounted on the piston will move relative to the piston and thereby turn the respective wheel 6 relative to the arm 65 as adjusted by the respective manually operative speed control device, to thereby increase the speed or power output of the engine in accordance with the pressure of fluid supplied to pressure chamber 69.

The pressure of fluid effective in chamber 69 of the extensible links 67 associated with the two engines is arranged to be controlled through pipes 80 and 82 by the vernier control device 81. This device may be substantially like the start and reversing control devices 15 to 17 but without the stop devices associated with the latter. The device 81 may therefore comprise an operating lever 111 having a neutral position for opening both of the pipes 80 and 82 to the atmosphere. This lever may be moved from neutral position in a clockwise direction for supplying fluid to pipe 80 at a pressure proportional to the extent of such movement. The lever may also be movable in a counterclockwise direction from neutral position for supplying fluid to pipe 82 at a pressure proportional to the extent of such movement. Thus, by proper operation of lever 110, fluid at any desired pressure may be provided in pressure chamber 69 of link 67 associated with either engine for providing a desired increase in speed or power output of said engine.

The extensible links 67 are connected to the respective wheels 6 by removable pins 74, so that if desired, or if necessary due to failure of the fluid speed control system just described, the links and wheels may be disconnected from each other by removal of said pins to permit manual turning of the wheels 6 for controlling the speed of the engines.

Summary

It will now be seen that I have provided a system for controlling the starting, reversing and speed of a plurality of reversible engines whereby the engines may be controlled individually or in multiple. The system embodies means for preventing operation of the individual control means when the multiple control means is being operated, and vice versa, so as to thereby avoid, under all circumstances, interference of either of said control means with the other when controlling the engine or engines. The control medium is fluid under pressure which is particularly adapted for prompt and accurate remote control. A novel arrangement is provided for effecting a minor change in speed of either engine relative to the other in order, for instance, to bring the operation of the two engines into synchronism.

Having now described the invention, what I claim as new and desire to secure by Letters Patent is:

1. In combination, a device adjustable by fluid under pressure, two control means individually operable to provide fluid under pressure for controlling said device, and means operable by fluid under pressure, provided by one of said control means for controlling said device, to prevent operation of the other control means.

2. In combination, a plurality of adjusting means adjustable by fluid under pressure, a master control device operable to effect a supply of fluid under pressure to all of said adjusting means simultaneously for adjusting said adjusting means, an individual control device for each of said adjusting means operable to effect a supply of fluid under pressure to the respective adjusting means for adjusting same, interlock means operable by fluid under pressure supplied by operation of said master control device to prevent operation of the individual control devices and operable upon release of such fluid under pressure to provide for operation of said independent control devices, and other means operable by fluid under pressure, supplied by any one of said individual control devices for controlling said adjusting means, for rendering said master control device ineffective to supply fluid under pressure for controlling said adjusting means and effective to release fluid under pressure from said interlock means.

3. In combination, a plurality of adjustable devices, a master manually operable control device arranged to control said plurality of adjustable devices in unison, a plurality of individual manually operable control devices, one for each of said adjustable devices, separately operable to control the respective adjustable devices, movable means controlled by said individual control devices and operable upon operation of any one or more of said individual control devices to control the respective adjustable device or devices to render said master control device ineffective to control said adjustable devices, said movable means being ineffective to control said individual control devices, and other movable means controlled by said master control device, and separate from and movable relative to the first named movable means for rendering said plurality of control devices ineffective to control said adjustable devices, said master control device being operable upon operation to control said adjusting devices to render said other movable means effective.

4. In combination, two individual control levers, a master control lever, each of said levers having a normal position and being movable out of said normal position, movable means associated with said master lever for holding same against movement out of said normal position, other movable means associated with said individual levers separate from and movable relative to the first named movable means for holding said individual levers against movement out of their normal positions, means controlled by said master lever operable upon movement thereof out of normal position to effect movement of said other movable means relative to the first named movable means to render said other movable means effective and operable in said normal position to render said other movable means ineffective, and means controlled by said individual control levers operable upon movement thereof out of normal position to effect movement of said first named movable means relative to said other movable means, to render said first named movable means effective and operable in the normal position of said individual levers to render said first named movable means ineffective, said master lever having no control over said first named movable means, and said individual levers having no control over said other movable means.

5. A control apparatus comprising two pipes, a control valve device for each of said pipes for regulating pressure of fluid therein, each control valve device comprising a lever having a normal position to effect operation of the respective control valve device to provide one pressure condition in the respective pipe and being movable out of said normal position to effect operation of the respective control valve device to provide a different pressure condition in the respective pipe, means associated with each control valve device subject to and controlled by pressure of fluid provided only in the pipe connected to the other control device, said means being operable when subject to said different pressure condition to render the lever of the respective control device immovable from its normal position and when subject to said one pressure condition movable from its normal position.

6. A control apparatus comprising three pipes, a separate control valve device connected to each of said pipes and operable to regulate the pressure of fluid therein, fluid pressure controlled means associated with each of two of said control valve devices connected to and controlled by pressure of fluid in the pipe which is connected to the third control valve device, separate fluid pressure controlled means associated with said third control valve device, means including a double check valve device connecting said separate fluid pressure controlled means to the two pipes connected to said two control valve devices and operable to provide in said separate fluid pressure controlled means fluid from the one of said two pipes which is supplied with fluid at the higher pressure, each fluid pressure controlled means comprising means operable when subject to fluid at a pressure exceeding a certain degree to render the respective control valve device ineffective to regulate pressure of fluid in the respective one of said pipes and each fluid pressure controlled means further comprising means operable upon a reduction in pressure in the respective pipe to said certain degree to render the respective control valve device effective to regulate pressure of fluid in the respective pipe.

ROY R. STEVENS.

REFERENCES CITED

The following references are of record in the file of this patent:

UNITED STATES PATENTS

| Number | Name | Date |
| --- | --- | --- |
| 1,709,790 | Hild | Apr. 16, 1929 |
| 1,889,295 | Rosatelli | Nov. 29, 1932 |
| 1,978,990 | Cross | Oct. 30, 1934 |
| 2,009,659 | Hill et al. | July 30, 1935 |
| 2,068,660 | Curtis | Jan. 26, 1937 |
| 2,206,163 | Clench | July 2, 1940 |
| 2,240,166 | Stanley | Apr. 29, 1941 |
| 2,282,194 | Lamond | May 5, 1942 |
| 2,288,173 | Wohanka | June 30, 1942 |
| 2,289,654 | Keel | July 14, 1942 |
| 2,326,594 | Wood | Aug. 10, 1943 |